UNITED STATES PATENT OFFICE.

ROBERT E. SCHMIDT, OF ELBERFELD, GERMANY, ASSIGNOR TO THE FARBEN-FABRIKEN, VORMALS FR. BAYER & CO., OF SAME PLACE.

BLUE DYE FROM CHRYSAZIN.

SPECIFICATION forming part of Letters Patent No. 595,350, dated December 14, 1897.

Application filed August 11, 1897. Serial No. 647,911. (Specimens.)

*To all whom it may concern:*

Be it known that I, ROBERT E. SCHMIDT, doctor of philosophy, (assignor to the FARBENFABRIKEN, VORMALS FR. BAYER & CO., of Elberfeld, Germany,) residing at Elberfeld, Germany, have invented a new and useful Improvement in the Manufacture of Chrysazin Dyestuffs; and I do hereby declare the following to be an exact and clear description of my invention.

My invention relates to the production of a blue coloring-matter which is a disulfonic acid of paradiamido chrysazin, having the formula

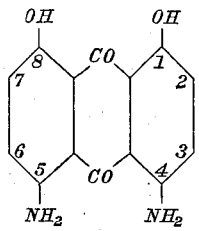

by sulfonating chrysazin, transforming the disulfo-acid thus produced into paradinitro chrysazin disulfonic acid, and, finally, reducing the latter.

In carrying out my new process I can proceed as follows: Twenty kilos, by weight, of chrysazin, having the formula

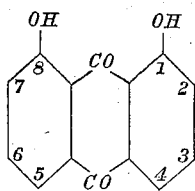

are dissolved in eighty kilos, by weight, of fuming sulfuric acid containing twenty per cent of $SO_3$. This solution is heated at about from 100° to 120° centigrade until a test portion, when mixed with water, yields a clear liquid. The solution is then mixed with one hundred and twenty kilos, by weight, of a sulfuric acid of 66° Baumé, to which mixture fifty-two liters of a mixture of concentrated sulfuric acid and concentrated nitric acid (the latter mixture containing 10.4 kilos, by weight, of pure nitric acid) are gradually added, the temperature being kept at from 20° to 30° centigrade. This reaction mixture is allowed to stand at ordinary temperature, being stirred from time to time, until a test portion, previously neutralized by means of sodium hydroxid, exhibits a pure blue color after the addition of stannate of sodium. If this stage is reached, the reaction is finished and the most part of the dinitrochrysazin disulfonic acid has separated in a crystalline state. The precipitate is filtered off by means of an asbestos filter and dissolved in fifteen hundred kilos, by weight, of hot water, to which solution fifty kilos, by weight, of potassium chlorid are added. On cooling, the potassium salt of the dinitrochrysazin disulfonic acid crystallizes from this solution in the form of beautiful yellow crystals, which easily dissolve in water, with a yellow color, this color turning into ruby on the addition of sodium hydroxid and into orange on adding caustic ammonia to the watery solution.

In order to reduce the dinitrodisulfonic acid, obtained as hereinbefore described, five kilos, by weight, of the potassium salt are dissolved in two hundred and fifty kilos, by weight, of water. To this liquid a solution prepared from twelve kilos, by weight, of stannous chlorid, thirty liters of water, and thirty liters of concentrated hydrochloric acid is added with stirring. The reduction is effected immediately, the color of the mixture turning into blue, and after a short while the paradiamidochrysazin disulfonic acid separates as a gelatinous mass, which, on being heated on a water-bath, is transformed into a precipitate composed of fine needles, which are filtered off, washed with a small quantity of water, and dried. The dyestuff thus obtained has the formula

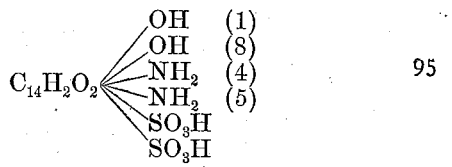

and represents a dark violet powder with a copper-like luster. It dissolves in water with comparative ease and is precipitated from the watery solution on the addition of mineral acids. On adding common salt to the watery solution a dark blue precipitate is separated, which most probably represents the sodium salt of the diamidochrysazin disulfonic acid. The coloring-matter is insoluble in absolute alcohol, in glacial acetic acid, and in benzene. In concentrated hydrochloric acid the dyestuff readily dissolves, producing a yellow color, and from this solution it is separated on adding an excess of water. It dissolves in alkalies with a pure greenish-blue color. In concentrated sulfuric acid it dissolves with a yellow color, which is not changed on the addition of boric acid. If, however, the dyestuff is heated with a solution of boric acid in sulfuric monohydrate, a dull violet-red solution is obtained which exhibits a very characteristic absorption spectrum.

The new coloring-matter dyes unmordanted wool in acid-baths beautiful even and fast-blue shades and yields on chrome mordanted fibers greenish-blue shades.

What I claim as new, and desire to secure by Letters Patent, is—

1. The process for producing a blue alizarin dyestuff, being a disulfo-acid of the para-diamidochrysazin having the formula

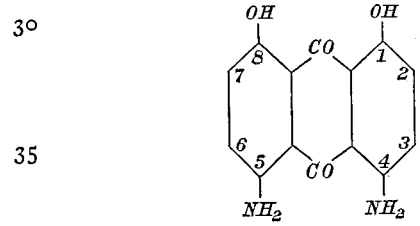

which process consists in treating chrysazin with sulfonating agents, such as fuming sulfuric acid of twenty per cent. $SO_3$, and then subjecting the thus obtained disulfo-acid of chrysazin to agents of nitration, such as a mixture of concentrated sulfuric and concentrated nitric acid, and finally converting the produced disulfo-acid of dinitrochrysazin into the disulfo-acid of diamidochrysazin by agents of reduction, such as stannous chlorid and muriatic acid, substantially as described.

2. As a new article of manufacture the alizarin dyestuff hereinbefore described having the formula:

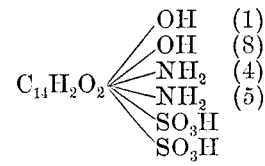

representing, when dry, a dark-violet powder with a copper-like luster, soluble in water with comparative ease, being precipitated from the watery solution by adding mineral acids, soluble in concentrated hydrochloric acid with a yellow color from which solution it is precipitated by the addition of water, soluble in concentrated sulfuric acid with a yellow color which is not changed on the addition of boric acid, soluble in alkalies with a pure greenish-blue color, insoluble in glacial acetic acid and in benzene, dyeing wool in acid-baths beautiful even and fast-blue shades and yielding on chrome mordanted fibers greenish-blue shades substantially as described.

In testimony whereof I have signed my name in the presence of two subscribing witnesses.

ROBERT E. SCHMIDT.

Witnesses:
R. E. JAHN,
OTTO KÖNIG.